(12) United States Patent
Adderly et al.

(10) Patent No.: US 9,201,806 B2
(45) Date of Patent: Dec. 1, 2015

(54) ANTICIPATORILY LOADING A PAGE OF MEMORY

(71) Applicant: International Business Machines Corporation, Armonk, NY (US)

(72) Inventors: Shawn A. Adderly, Essex Junction, VT (US); Paul A Niekrewicz, Essex Junction, VT (US); Aydin Suren, Essex Junction, VT (US); Sebastian T. Ventrone, South Burlington, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 228 days.

(21) Appl. No.: 13/734,218

(22) Filed: Jan. 4, 2013

(65) Prior Publication Data

US 2014/0195771 A1 Jul. 10, 2014

(51) Int. Cl.
*G06F 12/00* (2006.01)
*G06F 12/10* (2006.01)
*G06F 13/00* (2006.01)
*G06F 13/28* (2006.01)
*G06F 12/08* (2006.01)

(52) U.S. Cl.
CPC ........ *G06F 12/1027* (2013.01); *G06F 12/1009* (2013.01); *G06F 12/0862* (2013.01); *G06F 2212/1016* (2013.01); *G06F 2212/507* (2013.01); *G06F 2212/6024* (2013.01); *G06F 2212/654* (2013.01); *G06F 2212/681* (2013.01)

(58) Field of Classification Search
CPC .................. G06F 12/0862; G06F 2212/1016; G06F 2212/507; G06F 2212/6024
USPC ................................................. 711/205, 156
See application file for complete search history.

(56) References Cited

U.S. PATENT DOCUMENTS

| | | | | |
|---|---|---|---|---|
| 6,134,643 | A * | 10/2000 | Kedem et al. | 711/213 |
| 6,490,658 | B1 * | 12/2002 | Ahmed et al. | 711/140 |
| 6,567,894 | B1 * | 5/2003 | Hsu et al. | 711/137 |
| 6,678,795 | B1 * | 1/2004 | Moreno et al. | 711/137 |
| 7,225,297 | B2 * | 5/2007 | Heil | 711/137 |
| 8,161,246 | B2 | 4/2012 | Hooker et al. | |
| 8,607,005 | B2 * | 12/2013 | Boyd et al. | 711/154 |
| 2004/0123044 | A1 * | 6/2004 | Franaszek | 711/137 |
| 2008/0155226 | A1 * | 6/2008 | Davis et al. | 711/207 |
| 2008/0288751 | A1 * | 11/2008 | Kocev | 712/207 |
| 2011/0161631 | A1 * | 6/2011 | Yamazaki et al. | 712/207 |
| 2011/0320747 | A1 | 12/2011 | Madisetti et al. | |
| 2012/0117319 | A1 * | 5/2012 | Slavin | 711/108 |

* cited by examiner

*Primary Examiner* — Mark Giardino, Jr.
(74) *Attorney, Agent, or Firm* — Toler Law Group, P.C.

(57) ABSTRACT

In a particular embodiment, a method of anticipatorily loading a page of memory is provided. The method may include, during execution of first program code using a first page of memory, collecting data for at least one attribute of the first page of memory, including collecting data about at least one next page of memory that interacts with the first page of memory for a historical topology attribute of the first page of memory. The method may also include, during execution of second program code using the first page of memory, determining a second page of memory to anticipatorily load based on the historical topology attribute of the first page of memory.

19 Claims, 8 Drawing Sheets

ANTICIPATORILY LOADING A PAGE OF MEMORY

FIELD OF THE DISCLOSURE

The present disclosure relates generally to loading a page of memory.

BACKGROUND

A page of memory is typically loaded based on a need for the page of memory. For example, the need for the page of memory may arise from a miss in a translation lookaside buffer or TLB miss. The TLB miss may lead to delays and unused resources while the page of memory is loaded. Thus, need-based loading of pages of memory may sometimes lead to inefficiencies.

SUMMARY OF THE DISCLOSURE

In a particular embodiment, a method of anticipatorily loading a page of memory is provided. The method may include, during execution of first program code using a first page of memory, collecting data for at least one attribute of the first page of memory, including collecting data about at least one next page of memory that interacts with the first page of memory for a historical topology attribute of the first page of memory. The method may also include, during execution of second program code using the first page of memory, determining a second page of memory to anticipatorily load based on the historical topology attribute of the first page of memory.

In another embodiment, an apparatus may include a memory storing program code. The apparatus may also include a processor configured to access the memory and execute the program code to, during execution of first program code using a first page of memory, collect data for at least one attribute of the first page of memory, including collecting data about at least one next page of memory that interacts with the first page of memory for a historical topology attribute of the first page of memory, and during execution of second program code using the first page of memory, determine a second page of memory to anticipatorily load based on the historical topology attribute of the first page of memory.

Another particular embodiment may include a program product that includes program code to program code to, during execution of first program code using a first page of memory, collect data for at least one attribute of the first page of memory, including collecting data about at least one next page of memory that interacts with the first page of memory for a historical topology attribute of the first page of memory, and during execution of second program code using the first page of memory, determine a second page of memory to anticipatorily load based on the historical topology attribute of the first page of memory. The program product may further include a computer readable medium bearing the program code.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

DETAILED DESCRIPTION

Anticipation-based loading of pages of memory is described herein. For example, anticipation-based loading may anticipate which page or pages of memory may soon be referenced by program code and the page or pages of memory may be loaded before there is a need for the page or pages of memory. In a particular embodiment, a method may include, during execution of first program code using a first page of memory, collecting data for at least one attribute of the first page of memory, including collecting data about at least one next page of memory that interacts with the first page of memory for a historical topology attribute of the first page of memory. The method may also include, during execution of second program code using the first page of memory, determining a second page of memory to anticipatorily load based on the historical topology attribute of the first page of memory. The method may anticipatorily load the second page of memory.

Under need-based loading of pages of memory, attributes of an active page of memory may not be used to predict which page of memory may be referenced next. For example, a page data cache may simply be remapped from an external page space to an internal page map and substantially every page may be treated equally, with no connection of data made to attributes within the data. Indeed, previous computing system use or application use may not be considered, and a computing system may simply wait for a need for a page of memory in order to load next pages of memory.

However, under anticipation-based loading of pages of memory, pages of memory that are used in conjunction with a particular page of memory may be dynamically tracked, and collected data may be stored in a historical topology attribute. The historical topology attribute may then be used to anticipate which page or pages of memory may soon be referenced by program code (e.g., a process) and the page or pages of memory may be anticipatorily loaded. By doing so, a computing system may be able to potentially predict (or at least narrow down) and optimize subsequent page loads, including loading subsequent pages in a faster manner. Furthermore, the computing system may also perform debugging, optimizing, and other tasks using collected data for at least one attribute of a page of memory.

Figure 1:
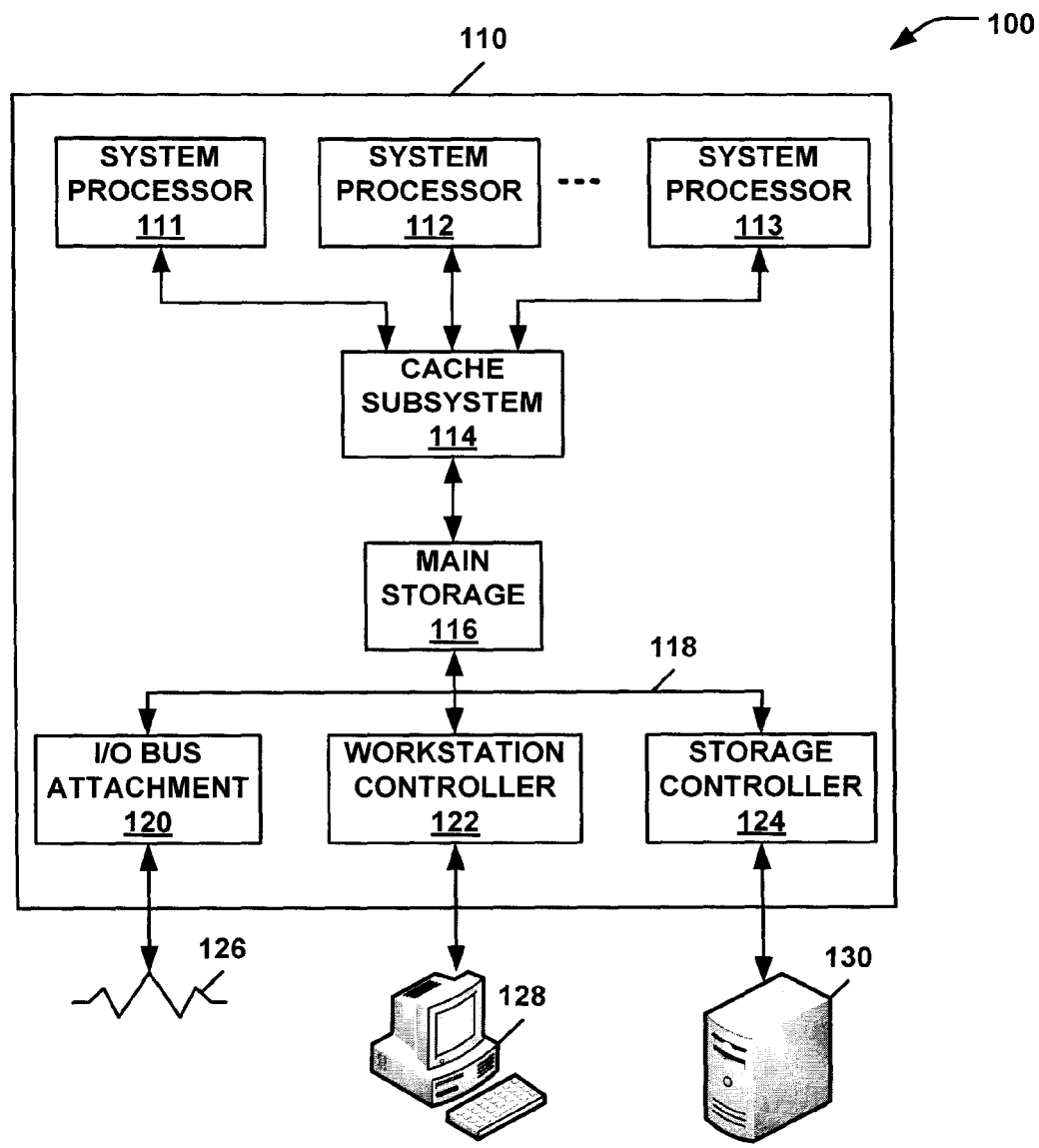
FIG. 1 is a block diagram of an apparatus configured to anticipatorily load a page of memory in a manner consistent with an embodiment.

Turning more particularly to the drawings, FIG. 1 generally illustrates a data processing apparatus 100 consistent with an embodiment for anticipatorily loading a page of memory. The apparatus 100, in specific embodiments, may include a computer, a computer system, a computing device, a server, a disk array, client computing entity, or other programmable device, such as a multi-user computer, a single-user computer, a handheld device, a networked device (including a computer in a cluster configuration), a mobile phone, a video game console (or other gaming system), etc. The apparatus 100 may be referred to as a logically partitioned computing system or computing system, but may be referred to as computer for the sake of brevity. One suitable implementation of the computer 110 may be a multi-user computer, such as a computer available from International Business Machines Corporation (IBM).

The computer 110 generally includes one or more physical processors 111, 112, 113 coupled to a memory subsystem including a main storage 116. The main storage 116 may include one or more dual in-line memory modules (DIMMs). The DIMM may include an array of dynamic random access memory (DRAM). Another or the same embodiment may a main storage having a static random access memory (SRAM), a flash memory, a hard disk drive, and/or another digital storage medium. The processors 111, 112, 113 may be multithreaded and/or may have multiple cores. A cache subsystem 114 is illustrated as interposed between the processors 111, 112, 113 and the main storage 116. The cache subsystem 114 typically includes one or more levels of data, instruction and/or combination caches, with certain caches either serving individual processors or multiple processors.

The main storage 116 may be coupled to a number of external input/output (I/O) devices via a system bus 118 and a plurality of interface devices, e.g., an I/O bus attachment interface 120, a workstation controller 122, and/or a storage controller 124 that respectively provide external access to one or more external networks 126, one or more workstations 128, and/or one or more storage devices such as a direct access storage device (DASD) 130. The system bus 118 may also be coupled to a user input (not shown) operable by a user of the computer 110 to enter data (i.e., the user input sources may include a mouse, a keyboard, etc.) and a display (not shown) operable to display data from the computer 110 (i.e., the display may be a CRT monitor, an LCD display panel, etc.). The computer 110 may also be configured as a member of a distributed computing environment and communicate with other members of that distributed computing environment through a network 126.

Figure 2:
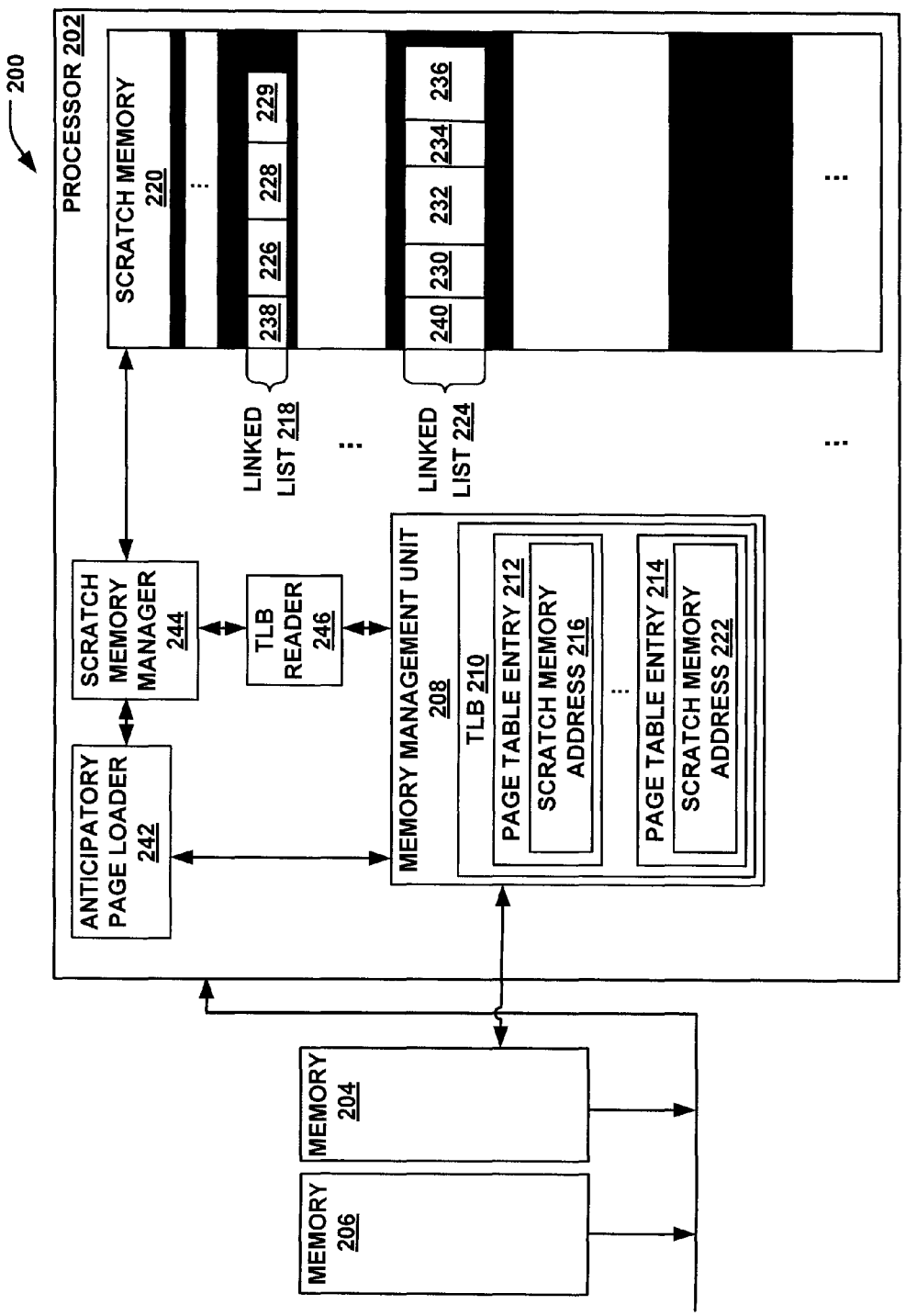
FIG. 2 is a block diagram of the primary software components and hardware components of the apparatus of FIG. 1.

Turning to FIG. 2, this figure illustrates a block diagram of the primary software components and hardware components of the apparatus 100 of FIG. 1. Specifically, a computer 200 of FIG. 2 may be similar to the computer 110 of FIG. 1. The computer 200 may include at least one processor 202 or central processing unit (CPU) coupled with at least one memory, such as a memory 204 and a memory 206. The processor 202 may be incorporated into the system processors 111, 112, 113 illustrated in FIG. 1, or into a separate processor. The memories 204, 206 may be incorporated into the cache subsystem 114, the main storage 116, or the DASD 130 illustrated in FIG. 1, or into a separate memory. More specifically, the memories 204, 206 may be incorporated into the main storage 116 of FIG. 1, the memory 204 may be a volatile memory (e.g., an SRAM), and the memory 206 may be a non-volatile memory (e.g., a hard disk drive). As will be described further herein, pages of memory may be anticipatorily loaded from the memory 206 to the memory 204, potentially speeding up and improving page loading times. Alternatively, pages of memory may be anticipatorily loaded form the memory 206 to an L1 cache similar to the cache subsystem 114 of FIG. 1. For simplicity, the discussion will reference anticipatorily loading into the memory 204. Furthermore, the computer 200 may also include a memory controller (not shown) coupled to the memories 204, 206 to carry out the anticipatory loading indicated by an anticipatory page loader 242 (discussed further herein). The processor 202 may be configured to execute program code stored on the memories 204, 206.

The processor 202 may include a memory management unit 208 that includes a translation lookaside buffer (TLB) 210. In particular, the TLB 210 may be a cache with a fixed size. The TLB 210 may be incorporated into the cache subsystem 114 illustrated in FIG. 1, or into a separate cache. The TLB 210 may include a fixed number of page table entries for pages of memory, and the page table entries include mapping of virtual memory addresses to physical memory addresses for those pages of memory. Indeed, the TLB 210 may include the most recently used mappings from a page table (not shown) of an operating system (not shown) of the computer 200. The TLB 210 may include a page table entry 212 for a first page of memory, as well as other page table entries, such as page table entry 214 for another page of memory. For simplicity, two page table entries are illustrated, but the TLB 210 may include more than two page table entries. If a page of memory has a corresponding page table entry in the TLB 210, then the page of memory is likely an active page of memory for the program code that is active (e.g., active program code, active process, active program, active application, etc.). The TLB 210 may be implemented as a content-addressable memory (CAM), in which a CAM search key is a virtual memory address and a search result is a physical memory address. Indeed, there may be a CAM like stage for initial lookup within a page translation location.

The page table entry 212 for the first page of memory may include a scratch memory address 216 that points to a linked list 218 in a scratch memory 220 of the first page of memory. The scratch memory address 216 may be embedded in a header of the page table entry 212, and may be the starting address of the linked list 218. The linked list 218 may store collected data for at least one attribute of the first page of memory, including collecting data about at least one next page of memory that interacts with the first page of memory for a historical topology attribute of the first page of memory. Similarly, the page table entry 214 for the other page of memory may include a scratch memory address 222 that points to a linked list 224 in the scratch memory 220 of the other page of memory. The scratch memory address 222 may be embedded in a header of the page table entry 214. The linked list 224 may store collected data for at least one attribute of the other page of memory, including collecting data about at least one next page of memory that interacts with the first page of memory for a historical topology attribute of the first page of memory. For simplicity, two linked lists are illustrated in the scratch memory 220, but the scratch memory 220 may include more than two linked lists. Indeed, each white space may be a linked list, and each black space may be empty.

The scratch memory 220 may be practically any type of memory. For example, the scratch memory 220 may a physical memory and may include registers. The scratch memory 220 may be a semaphore page attribute scratch space. Additionally, the scratch memory 220 may be considered an extension of the TLB 210, as it may include a corresponding linked list of attributes for practically each page of memory with a page table entry of the TLB 210. Moreover, instead of losing the TLB 210, the TLB 210 may be preserved in the scratch memory 220, and the scratch memory 220 may be preserved in the memory 204 and/or the memory 206.

The scratch memory 220 may also dynamically grow, even though the TLB 210 may be fixed in size. For example, data may be collected for two attributes of the first page of memory and the linked list 218 may dynamically grow to accommodate the collected data for the two attributes. A linked list node 226 of the linked list 218 may store collected data for the first of the two attributes and linked list nodes 228, 229 of the linked list 218 may store collected data for the second of the two attributes. On the other hand, data may be collected for four attributes for the other page of memory, and the linked list 224 may dynamically grow to accommodate the collected data for the three attributes. A linked list node 230 of the linked list 224 may store collected data for the first of the four attributes, a linked list node 232 of the linked list 224 may store collected data for the second of the four attributes, a linked list node 234 of the linked list 224 may store collected data for the third of the four attributes, and a linked list node 236 of the linked list 224 may store collected data for the fourth of the four attributes. Indeed, each of the linked lists 218, 224 may dynamically grow to accommodate the collected data (e.g., with the linked list 224 of the other page of memory dynamically growing larger than the linked list 218 of the first page of memory), and the scratch memory 220 may dynamically grow accordingly.

Furthermore, contents of the scratch memory 220 may dynamically change. For example, if the page table entry 212 for the first page of memory is removed from the TLB 210, then the linked list 218 for the first page of memory may be removed from the scratch memory 220 and stored in the memory 204 and/or the memory 206. Moreover, the linked list 218 may be retrieved from the memory 204 and/or the memory 206 and added back to the scratch memory 220 if the first page of memory is added to the TLB 210. The new page table entry for the first page of memory may include a new scratch memory address pointing to the linked list 218 in the scratch memory 220.

Turning more specifically to the linked lists 218, 224, these lists may be global linked lists or globally accessible within the computer 200 depending on sensitivity of the collected data. Each of the linked list nodes 226, 228, 229, 230, 232, 234, 236 of the linked lists 218, 224 may correspond to an attribute. Furthermore, a plurality of linked list nodes, such as the linked list nodes 228, 229, may correspond to the same attribute (e.g., the historical topology attribute). Each of the linked list nodes 226, 228, 229, 230, 232, 234, 236 may also include two fields. The first field may be an attribute data field corresponding to the attribute and the second field may be a pointer to another linked list node.

Moreover, each of the linked list nodes 226, 228, 229, 230, 232, 234, 236 may correspond to an allocation of memory of the scratch memory 220. The allocation of memory should accommodate the collected data for the attributes, and may be a few words of data. For example, timestamp data or date data may be collected for a date of usage attribute, whereas an identifier of a particular user data may be collected for an identity of user attribute. Nonetheless, this collected data may be accommodated. Indeed, size of data collected for one attribute may differ from size of data collected for another attribute, and as such, memory allocations for linked list nodes may also differ in size. The different heights and widths of the linked list nodes 226, 228, 229, 230, 232, 234, 236 may indicate different memory allocations of the scratch memory 220, with the linked lists 218, 224 dynamically growing accordingly. Alternatively, the size of data collected for one attribute may be substantially the same as the size of data collected for another attribute or for the same attribute for a another page of memory, with the linked lists 218, 223 dynamically growing accordingly. The various linked list nodes 226, 228, 229, 230, 232, 234, 236 of the linked lists 218, 224 may be traversed and read to retrieve the collected data of the attributes.

Each of the linked lists 218, 224 may also an attribute identifier to decode the linked lists 218, 224. For example, an attribute identifier at the front or beginning of the linked lists 218, 224 may be utilized to decode attribute data fields of the linked list nodes 226, 228, 229, 230, 232, 234, 236. The linked list 218 may include an attribute identifier 238 with a bit for each attribute data field, for instance, the attribute identifier 238 may include three bits. Similarly, the linked list 224 may include an attribute identifier 240 with a bit for each attribute data field, for instance, the attribute identifier 240 may include four bits. As an example of decoding, if data is collected for two attributes of the first page of memory in the linked list 218, such as for a historical topology attribute and a stability attribute, then a bit for the attribute data field of linked list node 226 in the attribute identifier 238 equal to "0" may indicate the stability attribute instead of the historical topology attribute. Moreover, bits for the attribute data fields of the linked list nodes 228, 229 in the attribute identifier 240 equal to "1" may indicate the historical topology attribute instead of the stability attribute. For simplicity, the linked lists 218, 224 are illustrated with the attribute identifiers 238, 240 and linked list nodes 226, 228, 229, 230, 232, 234, 236, but the linked lists 218, 224 may be different (e.g., may include a different number of linked list nodes, may not include attribute identifiers, etc.)

The collected data for at least one attribute may be updated in the linked lists 218, 224 in the scratch memory 220, as appropriate. For example, a modified least recently used (LRU) algorithm (discussed further herein) may be utilized to remove memory addresses of pages under the historical topology attribute to create space for new memory addresses of pages under the historical topology attribute. Indeed, the modified least recently used algorithm may rely on at least one other attribute of the linked lists 218, 224, such as a pattern usage attribute, to make decisions regarding which memory address of pages to remove under the historical topology attribute. The modified lead recent used algorithm may also be utilized to remove pages of memory from the TLB 210.

Turning more specifically to the attributes, attributes may be created via a compiler. For example, at compiler time, the most important attributes may be identified, and this information may be added in a binary stream. Alternatively or additionally, a user may be prompted for the most important attributes and the user's selection may be used at run time. A user, such as a programmer or designer, may even create a starting historical topology and the compiler may use the starting historical topology. Alternatively or additionally, an application or program may come in with a NULL attribute, and then the program code under execution may generate its own attribute. Furthermore, data may be collected under an attribute about pages of memory interacting with the first page of memory, about the first page of memory, about the program code, about the computer 200, a combination thereof, or practically anything else that may be tracked.

Data may be collected for a variety of attributes by an anticipatory page loader 242 (discussed further hereinbelow). For example, an attribute may be the historical topology attribute, the stability attribute, a prior execution time attribute, a date of usage attribute, a pattern usage attribute, a network locality attribute, an identity of user attribute, a stability attribute, a response time attribute, an algorithm attribute, or a created attribute. Data may be collected for at least one attribute (e.g., only one attribute or more than one attribute). Those of ordinary skill in the art will appreciate that this is not an exhaustive list of attributes, and data may be collected for other attributes as well. Indeed, another attribute may be an associated program attribute related to collecting data regarding associated programs (or applications or program code).

Starting with the historical topology attribute, the historical topology attribute may be utilized to track a historical topology of pages of memory that interacts with a certain page of memory, such as the first page of memory. For example, a historical topology may depend on a user, which routines are running, etc. A page routing path may be created over time, from practically any page of memory to its next page path along with iterations, resulting in the historical topology. The historical topology may keep track in real-time as program code is executing of the unique page history topography. The historical topologies may be stored in historical topology attributes and traversed, such that the history may be constructed and/or updated. The historical topologies may be utilized by selection algorithms, for page allocation at a macro level or software level, etc.

Specifically, memory addresses of pages of memory may be collected for the historical topology attribute. For example, as the first page of memory (or first page unit) is executing in the processor 202, memory addresses for active pages that interact with the first page of memory (e.g., interact via branches or data transfers) may be stored in the linked list 218 under the historical topology attribute. Indeed, a historical topology of a certain page of memory may simply depend on the interactions. For example, a particular page of memory may interact with thirty other pages of memory and the corresponding linked list may dynamically grow to accommodate these thirty pages of memory of that historical topology under the particular page's historical topology attribute, but another page of memory may simply interact with two other pages of memory and the corresponding linked list may dynamically grow to accommodate these two pages of memory of that historical topology under the other page's historical topology attribute.

Of note, the term "interact" may include scenarios where a page of memory (e.g., such as an active page) interacts with the first page of memory or where the first page of memory interacts with a page of memory (e.g., such as an active page). Where a page of memory interacts with the first page of memory, the page of memory may likely be loaded into the memory 204. In some embodiments, pages of memory loaded after the first page of memory may also be considered to be interacting with the first page of memory. Thus, data may be collected about at least one next page of memory that is loaded after the first page of memory is loaded for the historical topology attribute of the first page of memory.

Data regarding a probability of usage may be collected under the pattern usage attribute. For example, as active pages interact with the first page of memory, data may be collected for the pattern usage attribute. Indeed, a bit may be added for each use of an active page of memory. For example, a bit may be added for each page entry of use of an active page while the processor 202 is using the first page of memory. Furthermore, in some embodiments, a bit may be added for each use of the first page of memory. For example, each page entry of use of the first page while the processor 202 is executing program code that caused the processor 202 to use the first page of memory. Thus, data may be collected under the pattern usage attribute for pages of memory interacting with the first page, as well as for the first page. The pattern usage attribute may also be considered to reflect a number of swap outs (e.g., exits and/or returns). For example, an active page may be used after it is swapped back in after being swapped out.

The stability attribute may relate to a page status. Data regarding how the first page of memory is functioning may be collected under the stability attribute. A user may define what status or statuses to track, as well as how many bits to use, how many entries, resolution of collected data, etc. For example, under the stability attribute, data may be collected regarding the number of crashes, number of crashes after restarting, duration of a crash (e.g., in seconds, minutes, etc.), etc. The stability attribute may even be defined by a user to track whether something is failing more often than something else.

Under the prior execution time attribute, data related to a number of processor minutes used in a prior (e.g., last) execution may be collected. Under the date of usage attribute, absolute date data may be collected. Under the network locality attribute, average IO port latency data may be collected. Under the identity of user attribute, identifier of a user data may be collected. Under the response time attribute, average memory latency data may be collected. Under an algorithm attribute, data related to algorithms that previously worked may be collected, and the data that is collected may be processor dependent on execute unit assignment tries. Under the created attribute, an attribute may be created. For example, a standardized attribute may be utilized by an operating system or utilized for a special purpose (e.g., commercial and/or government data mining). In particular, for the created attribute, a defined methodology may be used to create the created attribute, update the created attribute, and utilize the created attribute. The created attribute may be unique and data may be collected accordingly.

Those of ordinary skill in the art will appreciate that the discussion of attributes is not meant to be exhaustive, and various modifications may be possible. For example, data may be collected for the discussed attributes, or other attributes, regarding duration of an exit, whether or not a page of memory is repeating, order that pages of memory were used, etc. Indeed, attributes may simply be defined as a set of numerical values that are corresponding to a user's defined parameter list. This list may be numerical to allow re-assignment of parameters depending upon an application. For example, eights bits may be used for up to 256 attributes. A program may be able to update an attribute based upon its parameter. In addition, an operating system may choose to update its own section of attributes and user and/or system utilization data is stored.

In operation, during execution of first program code by the processor 202 using the first page of memory, the anticipatory page loader 242 may collect data for at least one attribute of the first page of memory, including collecting data about at least one next page of memory that interacts with the first page of memory for a historical topology attribute of the first page of memory. The anticipatory page loader 242 may be coupled to a scratch memory manager 244 and to the TLB 210 in the memory management unit 208. The scratch memory manager 244 may be coupled to the scratch memory 220 and configured to manage the scratch memory 220.

If page X of memory interacts with the first page of memory, then the anticipatory page loader 242 may send an address of page X to the scratch memory manager 244 to store the address of page X under the historical topology attribute of the first page. The scratch memory manager 244 may be coupled to a TLB reader 246, and the TLB reader 246 may be coupled to the TLB 210 in the memory management unit 208. The scratch memory manager 244 may learn the scratch memory address 216 of the linked list 218 of the first page from the page table entry 212 of the first page from the TLB reader 246, which reads the TLB 210. The scratch memory manager 244 may then store the address of page X in the attribute data field of the linked list node 228 in the linked list 218 under the historical topology attribute of the first page.

If page Y of memory interacts with the first page of memory, then the anticipatory page loader 242 may send an address of page Y to the scratch memory manager 244 to store the address of page Y under the historical topology attribute of the first page. The scratch memory manager 244 may learn the scratch memory address 216 of the linked list 218 of the first page from the page table entry 212 of the first page from the TLB reader 246. The scratch memory manager 244 may then store the address of page Y in the attribute data field of the linked list node 229 of the linked list 218 under the historical topology attribute of the first page.

The linked list 218 for the first page, as well as linked lists for other pages of the TLB 210, may be stored out from the scratch memory 220 to the memory 204 and/or the memory 206 in response to completion of the execution of the first program code by the processor 202. The page table entries of the TLB 210 may also be cleared. By storing out, the linked list 218 may be preserved.

During execution of second program code by the processor 202 using the first page of memory, the anticipatory page loader 242 may determine a second page of memory to anticipatorily load based on the historical topology attribute of the first page of memory. Indeed, as the first page of memory is used in the second program code (e.g., the first page of memory is loaded into the TLB 208 for second program code), the first page of memory's routes, exists, interactions, and other attributes stored in the linked list 218 may be stored back into the scratch memory 220 for analysis by the anticipatory page loader 242. And, pages of memory that may be anticipatorily loaded may be determined and anticipatorily loaded by the anticipatory page loader 242 prior to use of these pages of memory, potentially speeding up performance of the computer 200.

For example, the anticipatory page loader 242 may learn that the first page of memory may be in use (e.g., the first page may be loaded). As a result, the anticipatory page loader 242 may determine to anticipatorily load the second page of memory (e.g., page X of memory or page Y of memory) based on the attribute data fields of the linked list nodes 228, 229 of the historical topology attribute of the first page of memory. The anticipatory page loader 242 may determine to anticipatorily page X of memory, and the anticipatory page loader 242 may calculate a page address from and sends to a system bus (not shown) of the computer 200 to the memory 206 to load page X of memory to the memory 204. As such, the page X of memory may be anticipatorily loaded into the memory 204 and available during execution of the second program code.

The terminology "second program code" is used for simplicity herein. For example, execution of the second program code may be another execution of the first program code, such that the data collected for attributes during the previous execution of the first program code may potentially improve performance of a subsequent execution of substantially the same first program code. Alternatively, a first program or first application may include the first program code, and the second program or second application may include the second program code. Alternatively, a first program or first application may include both the first program code and the second program code. The second program code may include third program code, fourth program code, etc.

Before the anticipatory page loader 242 anticipatorily loaded the page X of memory for the second program code, the anticipatory page loader 242 may determine whether the page X of memory was already loaded into the memory 204. For example, the anticipatory page loader 242 may learn via the scratch memory manager 244, the TLB reader 246, and the TLB 210 whether the page X of memory already has a page entry in the TLB 210. For example, if the page table entry 214 corresponds to the page X of memory, then page X of memory is likely already loaded into the memory 204.

If page X of memory is already loaded into the memory 204, the anticipatory page loader 242 may determine whether data has previously been collected for at least one attribute of the second page of memory (e.g., the page X of memory), including collecting data about at least one next page of memory that interacts with the second page of memory for a historical topology attribute of the second page of memory. Moreover, the anticipatory page loader 242 may determine a fourth page of memory to anticipatorily load based on the historical topology attribute of the second page of memory (e.g., the page X of memory). For example, the scratch memory address 222 may point to the linked list 224 of the page X of memory, and the anticipatory page loader 242 may start anticipatorily loading the fourth page of memory based on the linked list 224. As such, even more pages of memory may be anticipatorily loaded, potentially speeding up and improving page loading times. The scratch memory address 222 (as well as other scratch memory addresses) may be calculated in the scratch memory 220 and may be added to the page table entry 214 by the anticipatory page loader 242 or the scratch memory manager 244.

The linked list 218 for the first page, as well as linked lists for other pages of the TLB 210, may be stored out from the scratch memory 220 to the memory 204 and/or the memory 206 in response to completion of the execution of the second program code by the processor 202. The page table entries of the TLB 210 may also be cleared. Upon storing back out, any page of memory (e.g., the page X of memory) that was anticipatorily loaded for the first page of memory, but not used, may be deleted from the linked list 218, or may remain in the linked list 218 but may have a lower likelihood (or priority) of being loaded upon the next use of the first page of memory (e.g., loading of the first page of memory during execution of N program code). Furthermore, the next time the first page is used in N program code (e.g., the next time the first page of memory is loaded into the TLB 210 for N program code), the linked list 218 may be stored back into the scratch memory 220 and the first page of memory's routes, exists, interactions, and other attributes stored in the linked list 218 may be analyzed. And, pages of memory may be anticipatorily loaded by the anticipatory page loader 242 prior to use of these pages of memory.

Those of ordinary skill in the art will appreciate that pages of memory, such as the second page of memory and the fourth page of memory discussed hereinabove, may be anticipatorily loaded before a TLB miss occurs. When a virtual address needs to be translated into a physical address, the TLB 210 may be searched. If a match is found, the physical address may be returned, referred to as a TLB hit. However, if no match is found, referred to as a TLB miss, then the page table may be searched, and if not in the page table, then a prefetch unit may try to correct the TLB miss. Indeed, the prefetch unit may figure out what page of memory to retrieve, may calculate where the page of memory is located (e.g., where in the memory 206 or DASD 130 of FIG. 1), may load the page of memory into the memory 204, and may add information into a page entry in the TLB 210 for this page of memory. If the prefetch unit cannot keep up, then a program counter of the program code under execution by the processor 202 may catch up to the prefetch unit, encounter the TLB miss, and execution of the program code may stall until the prefetch unit corrects the TLB miss.

The computer 200 may include a prefetch unit, as well as the anticipatory page loader 242 configured to collect and use collected data of attributes to determine which pages to anticipatorily load, in what order, and update collected data of attributes (e.g., update a historical topology attribute with a current next page of memory or updated other attributes). Indeed, the computer 200 may include the prefetch unit (not shown), as well as the anticipatory page loader 242, the scratch memory manager 244, the TLB reader 246, and the scratch memory 220. Each of these entities may work cooperatively. In particular, the anticipatory page loader 242 may anticipatorily load page X into the memory 204 before a TLB miss occurs for the page X based on the collected data of the attributes of the linked list 218 of the first page. For example, the anticipatory page loader 242 may start analyzing collected data of the historical topology attribute determine that the second program code may be going to page X of memory after the first page of memory, and as such, the anticipatory page loader 242 may anticipatorily load the page X of memory into the memory 204 based on this analysis (and without a TLB miss for the page X).

In addition to historical topology attributes, the anticipatory page loader 242 may use data collected for other attributes in a variety of ways (e.g., during execution of the second program code). As a first example, the anticipatory page loader 242 may determine from the collected data from at least one other attribute of the first page (e.g., the pattern usage attribute) whether the second page of memory (e.g., the page X of memory) has a higher likelihood of usage during execution of the second program code than the third page of memory (e.g., the page Y of memory). The anticipatory page loader 242 may determine to anticipatorily load the second page of memory (e.g., the page X of memory) before anticipatorily loading the third page of memory (e.g., the page Y of memory) in response to determining that the second page of memory (e.g., the page X of memory) has a higher likelihood of usage during execution of the second program code. As second and third examples, the anticipatory page loader 242 or other entity of the computer 200 may debug or optimize using the collected data of at least one attribute of the first page of memory. As a fourth example, the anticipatory page loader 242 or other entity may determine whether to remove a particular page of memory from the TLB 210 based on at least one attribute of the first page of memory. As a fifth example, the anticipatory page loader 242 or the scratch memory manager 244 may determine whether to remove particular collected data from the linked lists 218, 224 based on at least one attribute of the first page of memory. For example, the anticipatory page loader 242 or the scratch memory manager 244 may remove and replace particular collected data from the linked list 218 in order to update the collected data in the linked list 218 during execution of the second program code. By doing so, the collected data in the linked list 218 may be potentially be more useful for decision making and not become stale. Indeed, the collected data of attributes may be utilized to make determinations regarding (a) anticipatorily loading of pages of memory, (b) replacement of pages of memory and replacement of collected data of attributes, (c) error analysis, (d) performance tuning of programs, etc.

Turning more specifically to the fourth and fifth examples, removal based on at least one attribute of the first page of memory may be referred to herein as a modified least recently used algorithm. In the fourth example, the anticipatory page loader 242 or other entity may determine whether to remove a particular page of memory from the TLB 210 based on at least one attribute of the first page of memory, such as the pattern usage attribute of the first page. The attribute may include data indicating how many times page Y of memory (e.g., which interacted with the first page of memory) was added to the TLB 210 (e.g., last time a program was used). If the number of times that page Y of memory was added into the TLB 210 exceeds a threshold, then it may be more efficient to simply keep page Y of memory in the TLB 210, instead of continuously removing it out of and adding it back to the TLB 210.

Under a typical least recently used algorithm, if the page Y of memory is the least recently used in the TLB 210, then the page Y of memory may be removed from the TLB 210 regardless of how many times it may be added back to the TLB 210. However, under a modified least recently used algorithm, the page Y of memory may be kept in the TLB 210 based on the pattern usage attribute, even if the page Y of memory is the least recently used in the TLB 210. Under the modified least recently used algorithm, the next least recently used page of memory (assuming the pattern usage attribute indicates few additions back into the TLB 216 for this page of memory) may be removed from the TLB 210 instead of the page Y of memory.

Similarly, in the fifth example, the anticipatory page loader 242 or the scratch memory manager 244 may determine whether to remove particular collected data from the linked lists 218, 224 based on at least one attribute of the first page of memory. For example, the anticipatory page loader 242 or the scratch memory manager 244 may remove and replace particular collected data from the linked list 218 based on the pattern usage attribute in order to update the collected data in the linked list 218 during execution of the second program code. For example, a memory address of a page of memory stored in the linked list 218 may be removed using the modified least recently used algorithm based on the pattern attribute. Moreover, another memory address of another page of memory that interacted with the first page of memory may be stored in the linked list 218 under the historical topology attribute of the first page of memory. Indeed, the modified least recently used algorithm may be used in a variety of ways. For instance, a page of memory may be expired using the modified least recently used algorithm, which may free up the page table entry for another incoming page of memory, and which may lead to deletion of the entry of the expired page from the linked list 218 (e.g., combination of the fourth and fifth examples).

Those of ordinary skill in the art will appreciate that various modifications may be made to the discussion of FIG. 2, including adding or eliminating entities of FIG. 2, assigning different functionality to the entities of FIG. 2, etc. For example, the anticipatory page loader 244 may look at attributes not stored in a page table by reading a current page table, gathering page attributes from memory, and then a new page table entry may be calculated in the scratch space. The scratch memory 220 may be used to calculate the new page table entry and facilitate passage of attributes between pages of memory, as well as store attributes of a page of memory.

Moreover, other modifications may be made, for example, (i) collected data of an attribute may be stored in a page table entry of a page of memory in the TLB 210 instead of in a linked list in the scratch memory 220 (e.g., memory addresses of pages collected for a historical topology attribute may be stored in the page table entry instead of in the linked list, but may be limited by fixed size of the TLB 210), and/or (ii) static definitions may be utilized for the linked lists 218, 224 instead of dynamic definitions. Other modifications may include (iii)

a unique cache structured on a page boundary structure which results in fewer address tags for substantially same amount of data and basically much larger word lines per address map, (iv) a set of local addresses for current pages being read out of cache such as N number of local registers to allow more than one thread to read, (v) a link area of the cache (e.g. the TLB 210) that can be used to store substantially all pages with the substantially same parameters and ability to transverse the link area to locate data with similar attributes, etc.

Another modification may be that (vi) tables may be utilized instead of linked lists, and the link area may also be utilized. However, the tables may function in a manner similar to the linked lists 218, 224. For example, first program code (e.g., a program or application) may have N number of next pages that might be the next page depending upon the user execution of the program code. As the program code is being executed, page entry links may be updated with next page loads whenever a branch exceeds the addressing region of a current page (e.g., the first page). Depending upon available resources, N number of page usages may be stored, with the utilization of page LRU or a modified LRU mechanism to determine which page history to replace with a more current page history usage. The system may choose to discard the replaced page history or store out the data to an extended region of memory (e.g., the memory 204 and/or the memory 206). Upon a flush of the whole page from memory, its page history table may also be stored out to permanent memory (e.g., the memory 204 and/or the memory 206) for next usage. Reloading of pages of memory may utilize corresponding page usage tables to start loading up additional area based upon the predicted usage of the program code. At any time, memory usage analysis, for example, may be run on a number of current active pages, number of speculative loads, the spread of pages on a program thread, and/or core usage. Additional constraints (e.g., weighting) may be instituted to control the anticipatory loads.

Figure 3:
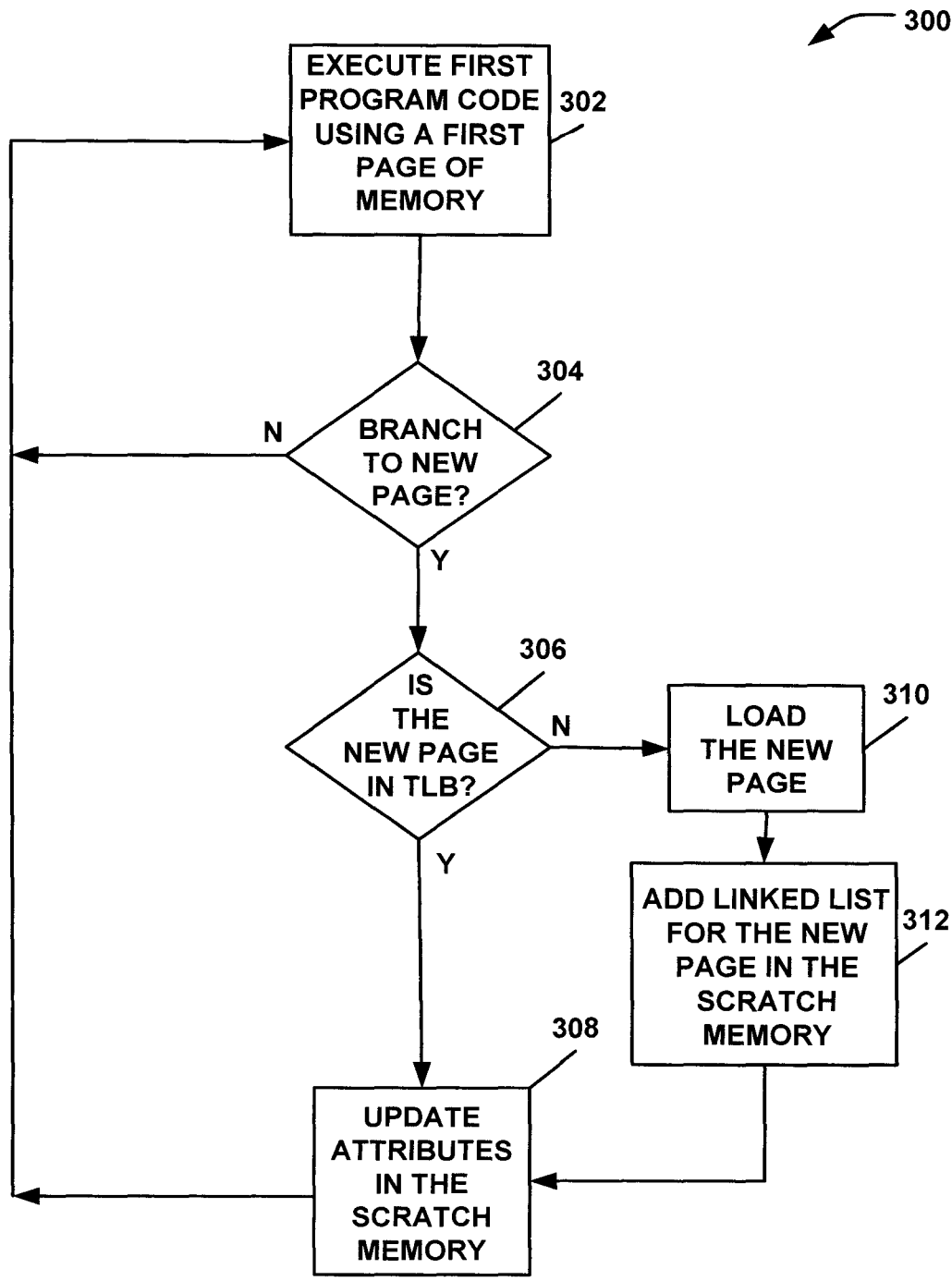
FIG. 3 is a flowchart of an embodiment of a method of collecting data for at least one attribute of a first page of memory using the apparatus of FIGS. 1-2.

Turning to FIG. 3, FIG. 3 is a flowchart 300 of an embodiment of a method of collecting data for at least one attribute of the first page of memory using the apparatus of FIGS. 1-2. The flowchart 300 of FIG. 3 may be executed by the computer 200, and more specifically, by the anticipatory page loader 242 of FIG. 2 and/or the scratch memory manager 244 of FIG. 2. The flowchart 300 may be executed for each active page of memory. FIG. 2 will be referenced throughout FIG. 3.

At 302, first program code using a first page of memory may be executed. For example, the processor 202 may execute first program code using the first page of memory (e.g., an active page of memory). The anticipatory page loader 242 may monitor the execution of the first program code using the first page of memory.

At 304, a determination may be made as to whether the execution of the first program code has led to a branch to a new page. For example, the anticipatory page loader 242 may determine whether there is a branch to a new page. A branch to a new page may occur when a page of memory exceeds the address region of the first page of memory. Where a branch to the new page is not determined, the anticipatory page loader 242 may continue to monitor the execution of the first program code using the first page of memory at 302. Where a branch to the new page is determined, the anticipatory page loader 242 may determine that the new page of memory interacts with the first page of memory and may collect data for the historical topology attribute of the first page, as well as collect data for other attributes of the first page of memory. As such, during execution of the first program code using the first page of memory, the anticipatory page loader 242 may collect data for at least one attribute of the first page of memory, including collecting data about at least one next page of memory that interacts with the first page of memory for the historical topology attribute of the first page of memory. Control may pass to 306.

At 306, a determination may be made as to whether the new page is in a TLB. For example, the anticipatory page loader 242 may determine whether the new page is in the TLB 210. Assuming the page table entry 214 corresponds to the new page, control may pass to 308 to update attributes in the scratch memory. For example, the anticipatory page loader 242 may update collected data of attributes in the linked list 218 of the first page of memory in the scratch memory 220 to add the new page under the historical topology attribute of the linked list 218. The anticipatory page loader 242 may also update collected data for other attributes in the linked list 218 of the first page of memory in the scratch memory 220. The modified least recently used algorithm may be used for the update.

Furthermore, as the new page of memory has a corresponding page table entry in the TLB 210, the new page may also have a portion of the scratch memory 220 for data of its attributes. For example, the linked list 224 may correspond to the new page of memory. As such, the anticipatory page loader 242 may also update collected data for attributes (e.g., a historical topology attribute of the new page and/or other attributes) in the linked list 224 of the new page of memory in the scratch memory 220. The modified least recently used algorithm may be used for the update. The anticipatory page loader 242 may continue to monitor the execution of the first program code using the first page of memory at 302.

Returning to 306, where the new page is not in the TLB, a TLB miss may occur. Control may pass to 310. At 310, a prefetch unit may load the new page into the memory 204, and the new page may be added to the page table entry 214 in the TLB 210.

At 312, a linked list for the new page may be added to the scratch memory. For example, the linked list 224 may be added for the new page of memory. Furthermore, a scratch memory address may be added to the page table entry 214 of the new page in the TLB 210, where the scratch memory address points to the linked list 224 of the new page of memory in the scratch memory 220. At 308, the anticipatory page loader 242 may collect data for attributes of the new page and store them in the linked list 224. Indeed, at 308, the anticipatory page loader 242 may update collected data for attributes (e.g., a historical topology attribute of the new page and/or other attributes) in the linked lists 218, 224. Control may pass to 302 to process the next active page of memory in the first program code.

Figure 4:
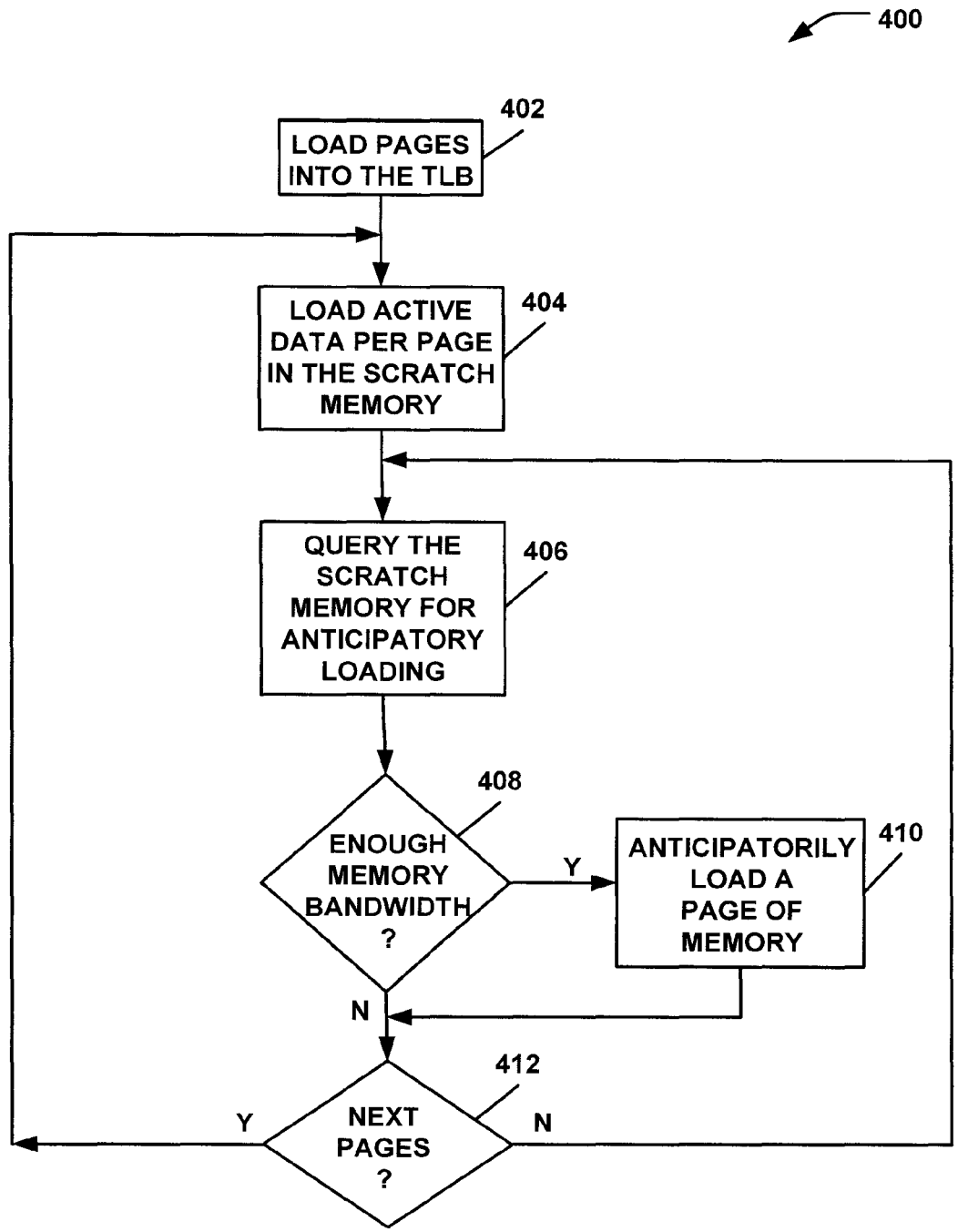
FIG. 4 is a flowchart of an embodiment of a method of anticipatorily loading a page of memory using the apparatus of FIGS. 1-2.

Turning to FIG. 4, FIG. 4 is a flowchart 400 of an embodiment of a method of anticipatorily loading a page of memory using the apparatus of FIGS. 1-2. The flowchart 400 of FIG. 4 may be executed by the computer 200, and more specifically, by the anticipatory page loader 242 of FIG. 2 and/or the scratch memory manager 244 of FIG. 2. The flowchart 400 of FIG. 4 may be executed after the flowchart 300 of FIG. 3. FIG. 2 will be referenced throughout FIG. 4.

At 402, at least one page of memory may be loaded into the TLB. For example, during execution of second program code using the first page of memory, the first page of memory may be loaded into the page table entry 212 of the TLB 210. Other pages of memory may also be loaded into the TLB 210.

At 404, active data per page may be loaded into the scratch memory. For example, the anticipatory page loader 242 may load the linked list 218 of the first page of memory into the scratch memory 220. Other linked lists of attributes may be loaded in the scratch memory 220, as well.

At 406, the scratch memory may be queried for anticipatory loading. For example, the anticipatory page loader 242 may determine a second page of memory to anticipatorily load into the memory 204 based on the historical topology attribute of the first page of memory or other attributes of the linked list 218. For example, the anticipatory page loader 242 may identify the new page from FIG. 3 to anticipatorily load.

At 408, a determination may be made as to whether there is enough memory bandwidth to anticipatorily load the identified page of memory. For example, the anticipatory page loader 242 may determine if the memory 204 has enough memory bandwidth. Where there is enough memory bandwidth, at 410, the identified page of memory may be anticipatorily loaded. For example, the anticipatory page loader 242 may anticipatorily load the second page of memory. Control may pass to 412 from either 408 or 410.

At 412, a determination may be made as to whether to process more pages of memory. If so, control may pass to 404. If not, control may pass to 406 and the scratch memory 220 may be queried for more anticipatory loading. For example, the anticipatory page loader 242 may determine a third page of memory to anticipatorily load into the memory 204 based on the historical topology attribute of the first page of memory or other attributes of the linked list 218.

Of note, 410 and 406 of the flowchart 400 may be modified. For example, at 410, the anticipatory page loader 242 may determine from the collected data for at least one attribute of the first page whether the second page of memory has a higher likelihood of usage during execution of the second program code than the third page of memory, and determine to anticipatorily load the second page of memory before anticipatorily loading the third page of memory in response to determining that the second page of memory has a higher likelihood of usage during execution of the second program code. At 406, the anticipatory page loader 242 may determine whether data has previously been collected for at least one attribute of the second page of memory, including collecting data about at least one next page of memory that interacts with the second page of memory for a historical topology attribute of the second page of memory, and determine a fourth page of memory to anticipatorily load based on the historical topology attribute of the second page of memory.

Figure 5:
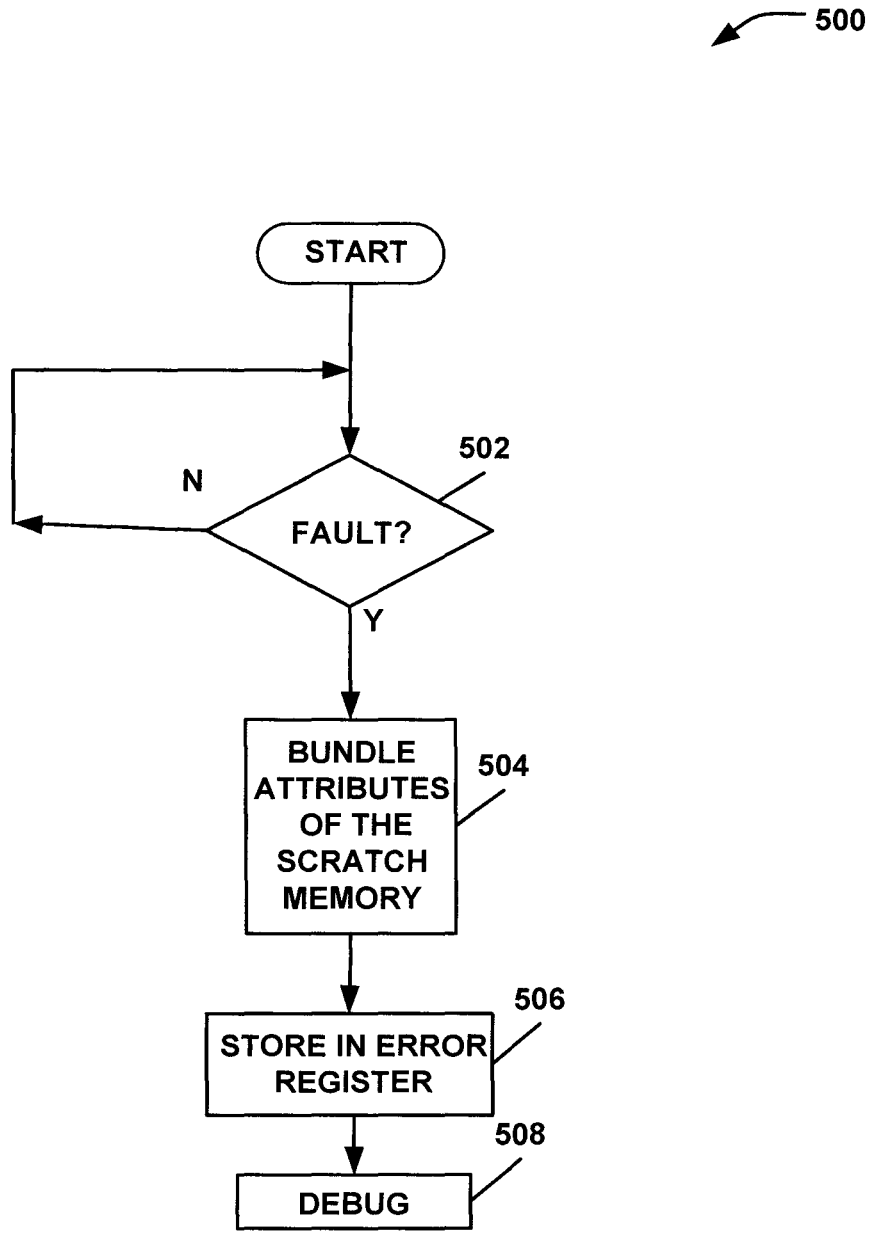
FIG. 5 is a flowchart of an embodiment of a method of debugging using collected data of at least one attribute of a first page of memory using the apparatus of FIGS. 1-2.

Turning to FIG. 5, FIG. 5 is a flowchart 500 of an embodiment of a method of debugging using collected data of at least one attribute of a first page of memory using the apparatus of FIGS. 1-2. The flowchart 500 of FIG. 5 may be executed by the computer 200, and more specifically, by the anticipatory page loader 242 of FIG. 2 and/or the scratch memory manager 244 of FIG. 2. The flowchart 500 of FIG. 5 may be executed after the flowchart 300 of FIG. 3. FIG. 2 will be referenced throughout FIG. 5.

At 502, a determination may be made as to whether or not there is a fault. For example, during execution of the second program code using the first page of memory, the anticipatory page loader 242 may determine if there is a fault with the first page. Where no fault is identified, the anticipatory page loader 242 may continue to monitor for a fault with the first page or monitor for a fault with another page. Where a fault is identified, control may pass to 504.

At 504, attributes of the scratch memory may be bundled. For example, the anticipatory page loader 242 may bundle attributes of the first page of memory from the linked list 218 in the scratch memory 220, as appropriate. For example, the anticipatory page loader 242 may bundle fault related attributes, desired attributes, etc. Specifically, the collected data of the attributes may be bundled.

At 506, the bundled attributes may be stored in an error register. For example, the anticipatory page loader 242 may store the collected data of the bundled attributes in an error register. At 508, the error register may be utilized for debugging. For example, an operating system of the computer 200 may utilize the error register and its contents for debugging.

Those of ordinary skill in the art may appreciate that with the amount of concurrent applications running, and the reuse or running of previous run applications, anticipation-based loading of pages of memory may improve efficiency and performance. Indeed, an anticipation-based page loading system may be created as a page and/or program controller, and attributes of pages may be added to a scratch memory (or even to a TLB, page table program, and/or data) to include functions as historical topology (e.g., historical next destinations), duration of previous usage, and other attributes. By utilizing the attributes and the historical topology attribute, the anticipation-based page loading system may anticipatorily load pages prior to usage of those pages, and also enhance a least recently used algorithm of replacing pages based, for example, on a deeper understanding of the statistical probability of a page being reused by some other page currently being accessed by another program. The anticipation-based page loading system may lead to improved use of memory bandwidth, the modified least recently used algorithm that may improve replacement tasks, a software operating system may be enhanced to utilize the anticipation-based page loading system for improved system performance, etc. Also, by doing so, caches may have the last used data and look-ahead operations may be performed accordingly.

As technology moves more towards cloud computing, programs may not reside on a user computer. However, while a program may only be called upon usage, the data may be present upon closure of the program. As such, the data may be enhanced with key parameters that may allow more efficient usage of data, improved work flow of the program, and advanced data mining for system maintenance and/or national security. The attributes may be used for secondary programs, such as for data mining. As another example, in the context of a motion detection system, attributes may be established and used, and may include identifying faces and encoding the information via a compiler. At the run time, a face attribute may be checked with face data. Attributes may be part of the address or could be something else. Thus, attributes may be utilized in the context of a motion detection system, as well as in the context of a mode expression detection system, screening system to determine if a person is part of a company, a profiling system, etc. Attributes may also factor into least recently used replacements (as described in connection with the modified least recently used algorithm).

For example, attributes may also define the parameters of an application, as follows: (1) required page size; (2) time dimension, such as how often to refresh and/or replace data; and/or (3) total bandwidth and throughput of the required page and/or cache size. Furthermore, data may be analyzed and attributes of data may be extracted. The extracted attributes may be used to create the page space addresses. The page space may contain data whose attributes are similar to other data. Hence, a collection of various data with similar attributes may be identified by the page space location and/or address. Fast retrieval of similar data may also result (e.g., for data mining).

For example, to define attributes in the context of high definition television, as high definition television programming is being processed, a face may occupy ¼ of the size and the size of a cache may be determined, as well as speed of the cache refresh. For example, attributes may be assigned, such as 6 cache and 6 page size, and a refresh rate may be determined. For instance, substantially every 5 seconds, the cache may be flashed and renewed from a memory. Thus, attributes may help determine how long to keep data in a cache.

An application may also determine what attribute(s) is the most important. The application may communicate to architecture what data is the most important, and as such, the most important data may be kept in a cache as long as the application needs it (e.g., may be referred to as a modified most recently used algorithm). As such, the most important data (of most important attributes) may be locked in the cache. Other applications may delete the cache in a typical "most recently used" model as the cache is shared and a cache controller may not know what the most important data is in the cache.

Indeed, the goal may be to store the minimal amount of data required for an application with the least amount of latency by prioritizing attributes that determine which pages are stored in a cache. For simplicity, it may assume that an application may prioritize one attribute above all else. And, instead of applications refreshing data based on a typical least recently used algorithm, the application may determine what data is important by assigning and prioritizing attributes for the data. This would in turn may anticipate page misses on a first attempt of processing data, reload data from memory subsystem if another process tries to remove it out of a shared cache, and lock out other processes from using a shared cache and/or address space if its attribute is prioritized above all else. Moreover, memory traffic may be reduced by assigning an application as the master of its memory with the processes it calls as slaves. An attribute locks the data, which ensures it is refreshed before a cache miss. A cache controller my use multiple criteria to assign priority of its attributes. Priority may be determined at precompile (e.g., the user inputs attributes to look for which get stored in the application binary) and/or at run time (e.g., attributes are reshuffled in priority at run time based on incoming data).

Figure 6:
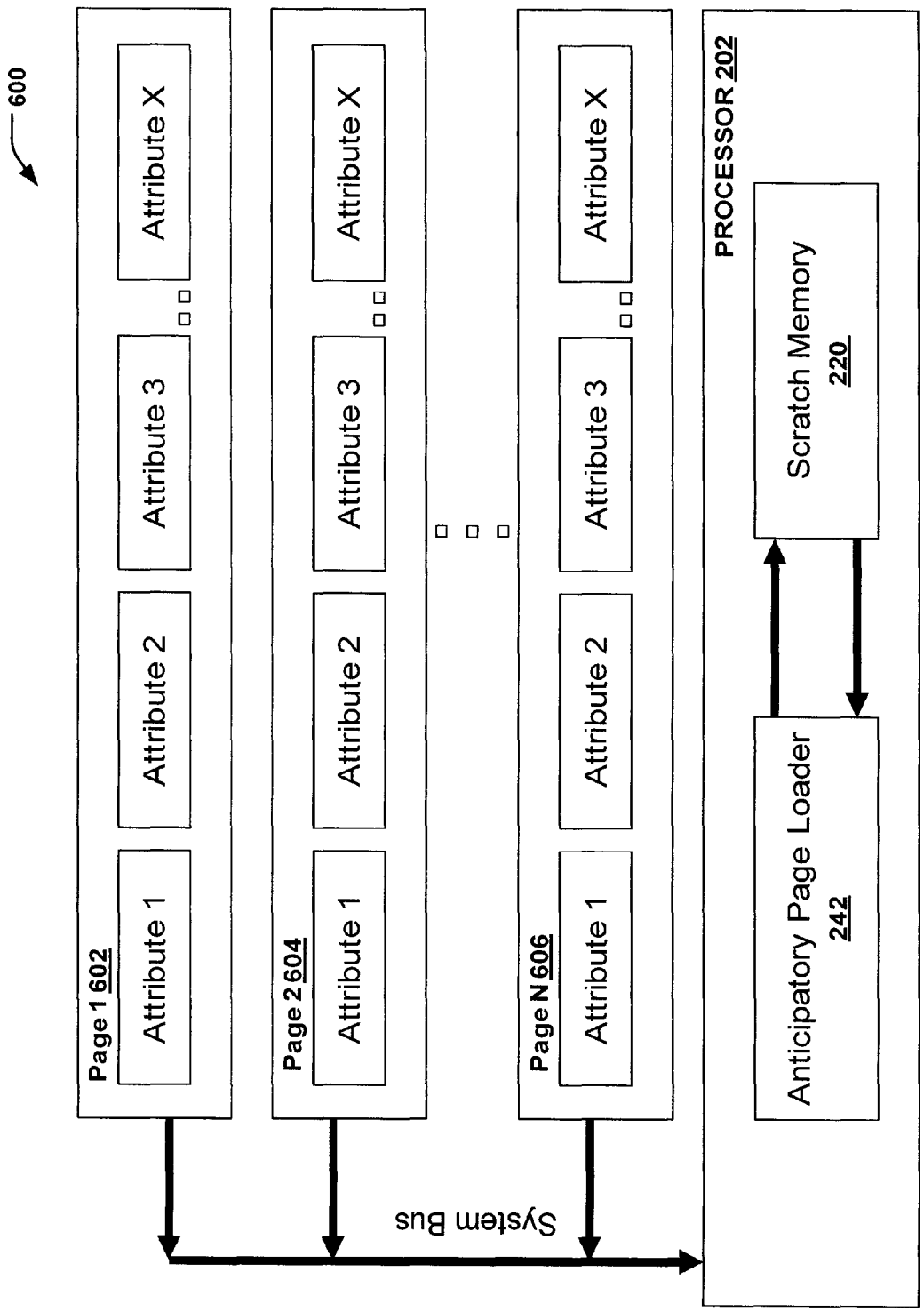
FIG. 6 is a diagram that elaborates on the anticipatory page loader of FIG. 2.

Diagram 600 of FIG. 6 elaborates on the anticipatory page loader 242 of FIG. 2. The anticipatory page loader 242 may be a hardware unit located inside of the processors (CPUs) 111, 112, 113. The anticipatory page loader 242 may be used to data mine the attributes on current page(s) 602, 604, 606 loaded and uses predictive analytics to analyze the attributes on the page looking for characteristics that suggest the page should be stored for quicker access. For example, one of the items searched for in the page(s) 602, 604, 606 may be information that gives information about the identity of the user, pattern usage of the user, or other information that may be used in determining which pages may be used next. The anticipatory page loader 242 stores this information to determine which pages in the page table currently not in the TLB 210 of FIG. 2 should be loaded into the scratch memory 220 of FIG. 2. This methodology may be more efficient than sequential page loading schemes that simply pre-load additional pages into the TLB 210 (as described hereinabove in connection to the prefetch unit), but do not use any form of predictive analysis. This methodology may also reduce TLB misses, reduce the number of times main memory (e.g., the memory 204 of FIG. 2) is accessed, and/or reduce the total number of that the disk (e.g., the memory 206 of FIG. 2) is accessed.

Figure 7:
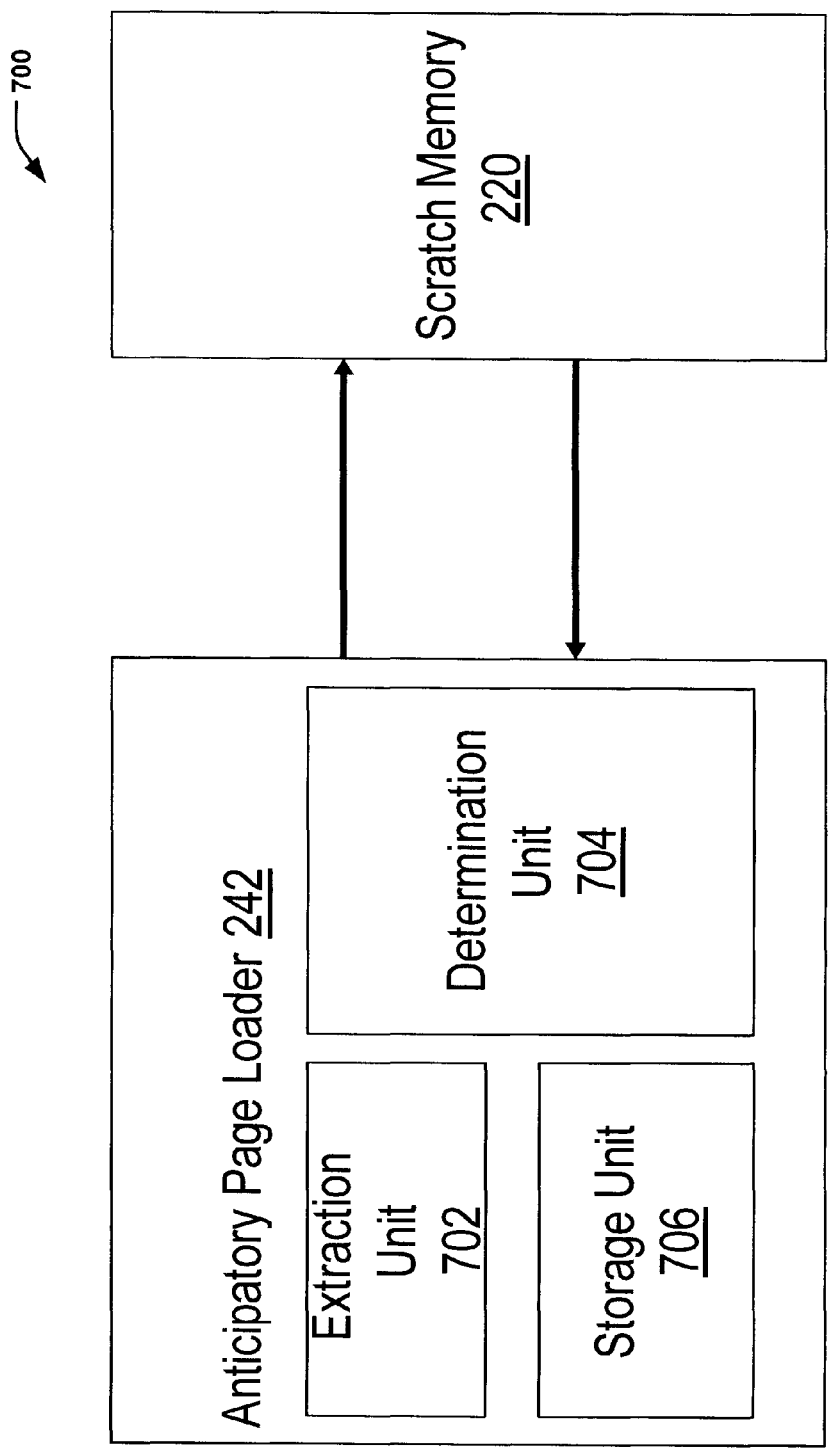
FIG. 7 is a diagram that elaborates on the anticipatory page loader of FIG. 2.

Diagram 700 of FIG. 7 elaborates on the anticipatory page loader 242 of FIG. 2. The anticipatory page loader 242 may be a hardware unit designed using CMOS logic with three main components, namely, an extraction unit 702, a determination unit 704, and a non-volatile storage unit 706. This may be a unique piece of hardware that uses the extraction unit 702 to data mine the page attributes that the determination unit 704 will analyze and determine which pages should be loaded anticipatorily or preemptively. The calculations that support the determination unit 704 in deciding this information may be performed in the scratch memory 220 of FIG. 2. Inside the determination unit 704, predictive analytics may be used to decide what pages are stored. Information determined from the stored or examined pages or from the system about prior page execution time, date of page usages, page or user pattern usages, network locality, identify of the user, stability of application, response time, etc. may be stored and used in the algorithm contained in the determination unit 704 to determine which pages are stored. Therefore, the anticipatory page loader 242 may become more adaptive over time. Moreover, the storage unit 706 may be an embedded non-volatile memory device that contains historical information that has aided the determination unit 704 in deciding which pages should be stored in the scratch memory 220 for future use. This historical information stored in the storage unit 706 may contain information such as prior page execution time, data of page usages, page or user pattern usages, network locality, identify of the user, stability of application, response time, etc.

Figure 8:
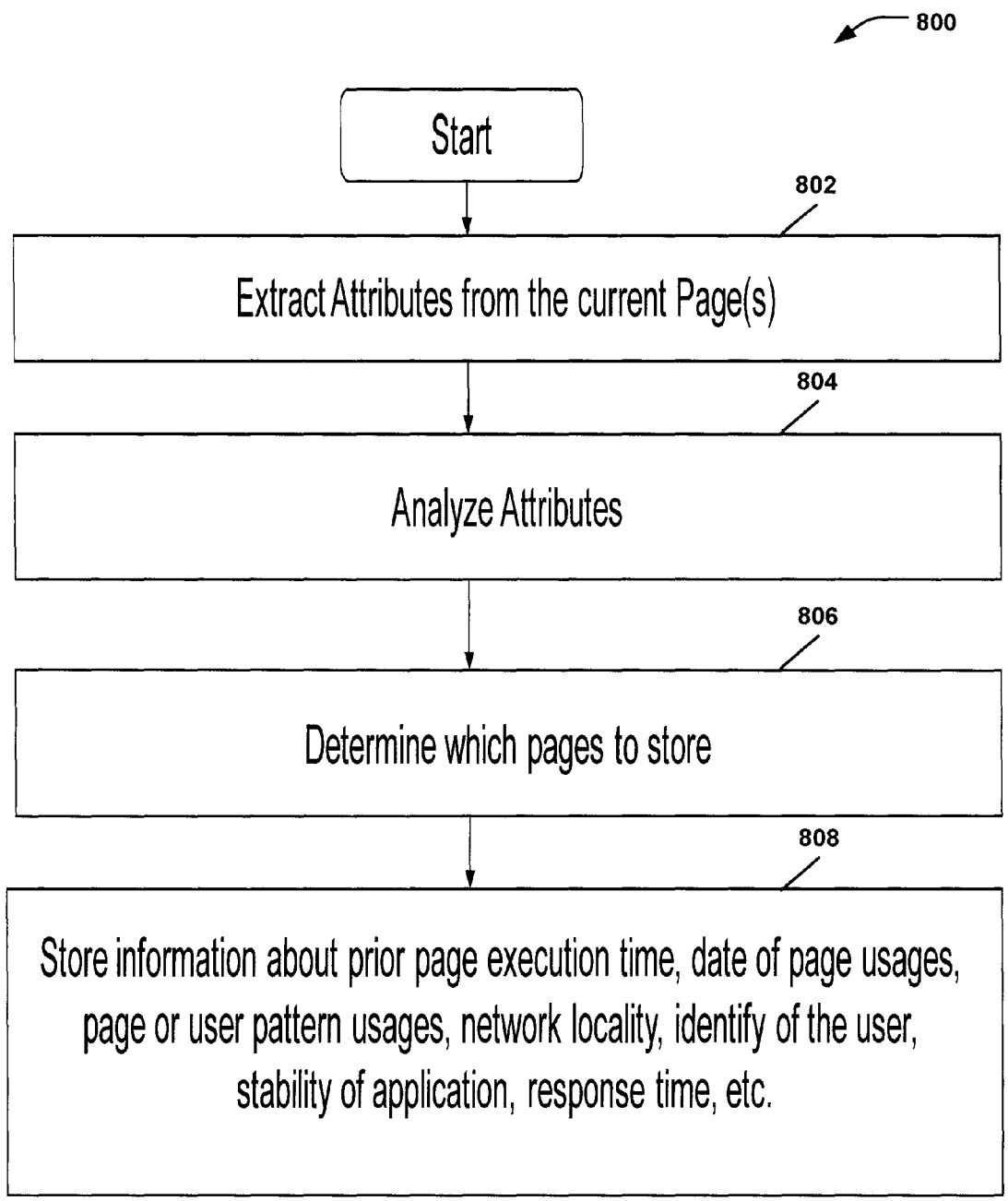
FIG. 8 is a flowchart of an embodiment of a functional flowchart of the anticipatory page loader of FIG. 2.

A flowchart 800 of FIG. 8 may be an embodiment of a functional flowchart of the anticipatory page loader 242 of FIG. 2. At 802, the anticipatory page loader 242 may extract attributes from the current page(s) using the extraction unit 702 of FIG. 7. At 804, the anticipatory page loader 242 may analyze attributes using the determination unit 704 of FIG. 7. At 806, the anticipatory page loader 242 may determine which pages to store using the determination unit 704 of FIG. 7. At 808, the anticipatory page loader 242 may store information about prior page execution time, date of page usages, page or user pattern usages, network locality, identify of the user, stability of application, response time, etc. using the storage unit 706 of FIG. 7.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. For example, an embodiment may include multiple processors connected to a single memory controller, either using separate processor busses from each processor to the memory controller, or using a single shared system bus that is connected to all processors and the memory controller. Thus, the present disclosure is not intended to be limited to the embodiments shown herein but is to be accorded the widest scope possible consistent with the principles and features as defined by the following claims.

The invention claimed is:

1. A method of anticipatorily loading a page of memory, the method comprising:
   during execution of first program code by a processor using a first page of memory, collecting data for at least one attribute of the first page of memory;
   during execution of second program code that accesses the first page of memory, determining to anticipatorily load a second page of memory, by the processor, based on the collected data for the at least one attribute of the first page of memory; and
   in response to determining that the second page of memory is already loaded, determining to anticipatorily load a third page of memory instead of the second page of memory, the third page of memory identified based on second collected data for at least one attribute of the second page of memory.

2. The method of claim 1, further comprising storing the collected data for the at least one attribute of the first page of memory in a linked list of the first page of memory in a scratch memory.

3. The method of claim 2, further comprising updating the collected data for the at least one attribute of the first page of memory in the linked list of the first page of memory in the scratch memory.

4. The method of claim 2, wherein the linked list of the first page of memory includes an attribute identifier to decode the linked list of the first page of memory.

5. The method of claim 2, further comprising adding a scratch memory address to a page entry of the first page in a translation lookaside buffer, wherein the scratch memory address points to the linked list of the first page of memory in the scratch memory.

6. The method of claim 1, further comprising:
   loading the third page of memory;
   after loading the third page of memory, determining to anticipatorily load a fourth page of memory based on the second collected data for at least one attribute of the second page of memory; and
   in response to determining to anticipatorily load the fourth page of memory, loading the fourth page of memory.

7. The method of claim 1, wherein the third page of memory is anticipatorily loaded from a first memory external to the processor to a second memory external to the processor, and wherein the second memory is disposed between the first memory and the processor.

8. The method of claim 1, wherein collecting data for the at least one attribute of the first page of memory further includes collecting data for at least one of a historical topology attribute or a created attribute.

9. The method of claim 1, wherein collecting data for the at least one attribute of the first page of memory includes collecting data for at least one of a prior execution time attribute, a date of usage attribute, a network locality attribute, an identity of user attribute, a stability attribute, a response time attribute, an algorithm attribute or any combination thereof.

10. The method of claim 1, further comprising determining whether to remove a particular page of memory from a translation lookaside buffer based on the collected data of the at least one attribute of the first page of memory.

11. The method of claim 1, further comprising determining whether to remove particular collected data from a linked list of attributes based on the collected data of the at least one attribute of the first page of memory.

12. The method of claim 1, further comprising debugging using the collected data of the at least one attribute of the first page of memory.

13. The method of claim 1, further comprising performing at least one of optimizing or data mining using the collected data of the at least one attribute of the first page of memory.

14. An apparatus comprising:
   a memory storing program code; and
   a processor configured to access the memory and execute the program code to:
      during execution of first program code using a first page of memory, collect data for at least one attribute of the first page of memory;
      during execution of second program code that accesses the first page of memory, determine to anticipatorily load a second page of memory based on the collected data for the at least one attribute of the first page of memory; and
      in response to determining that the second page of memory is already loaded, determine to anticipatorily load a third page of memory instead of the second page of memory, the third page of memory identified based on second collected data for at least one attribute of the second page of memory.

15. The apparatus of claim 14, wherein the processor is configured to execute the program code to store the collected data for the at least one attribute of the first page of memory in a linked list of the first page of memory in scratch memory.

16. The apparatus of claim 14, wherein the processor is configured to execute the program code to load the third page of memory.

17. The apparatus of claim 14, wherein the processor is configured to execute the program code to determine whether to remove a particular page of memory from a translation lookaside buffer based on the collected data of the at least one attribute of the first page of memory.

18. The apparatus of claim 14, wherein the processor is configured to execute the program code to determine whether to remove particular collected data from a linked list of attributes based on the collected data of the at least one attribute of the first page of memory.

19. A program product, comprising:
   program code to, during execution of first program code by a processor using a first page of memory, collect data for at least one attribute of the first page of memory;
   during execution of second program code that accesses the first page of memory, determine to anticipatorily load a second page of memory based on the collected data for the at least one attribute of the first page of memory; and
   in response to determining that the second page of memory is already loaded, determine to anticipatorily load a third page of memory instead of the second page of memory, the third page of memory identified based on second collected data for at least one attribute of the second page of memory; and
   a computer memory bearing the program code.

* * * * *